Figure 1:
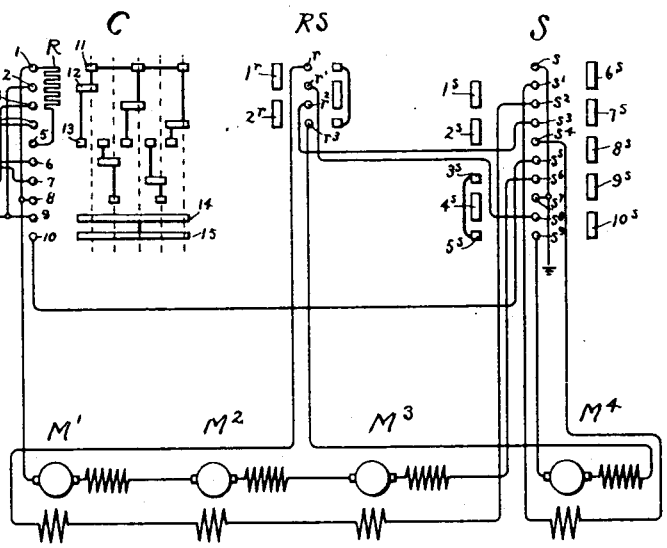

No. 873,101.  PATENTED DEC. 10, 1907.

W. I. SLICHTER.
REGENERATIVE SYSTEM FOR BRAKING.
APPLICATION FILED JUNE 11, 1906.

Witnesses
J. Ellis Glen.
Margaret E. Woolley

Inventor
Walter I. Slichter
by Albert G. Davis
Atty.

UNITED STATES PATENT OFFICE.

WALTER I. SLICHTER, OF SCHENECTADY, NEW YORK, ASSIGNOR TO GENERAL ELECTRIC COMPANY, A CORPORATION OF NEW YORK.

REGENERATIVE SYSTEM FOR BRAKING.

No. 873,101.  Specification of Letters Patent.  Patented Dec. 10, 1907.

Application filed June 11, 1906. Serial No. 321,105.

*To all whom it may concern:*

Be it known that I, WALTER I. SLICHTER, a citizen of the United States, residing at Schenectady, county of Schenectady, State of New York, have invented certain new and useful Improvements in Regenerative Systems for Braking, of which the following is a specification.

In electric railways, particularly where long and severe grades are to be encountered, it is highly advantageous to have the propelling motors act as retarding agents in descending the grades. A type of motor which has given satisfaction in alternating current systems for propelling cars or locomotives is the commutator series motor, preferably compensated.

The present invention relates particularly to systems embodying this type of motor, having for its objects to make it possible to operate such motors conveniently and efficiently as braking generators as occasion may require; to enable the motors to return energy to the line during their operation as braking generators; and to adapt them for operation as braking generators without the use of complicated apparatus or auxiliary apparatus of any kind other than a switch or switch mechanism. In its broader aspects, however, the invention is not confined to series motors operating on alternating currents but is capable of wider application, as will be apparent from the description and claims.

Viewing the invention from the standpoint of the series motor employed in groups and supplied with current through a transformer: I divide the motors into two groups during braking, one group containing preferably but a single motor having its field winding connected to the transformer and operating to excite the fields of the remaining motors, and the other group having its armatures connected to the transformer. In this arrangement the armature of the exciting motor generates current whose voltage is approximately in phase with the current in the field winding of that motor and therefore approximately 90° behind the line voltage. The current in the field windings which are connected to the armature of the exciting motor will in turn be approximately 90° behind the voltage generated in that armature and therefore the voltage generated by the armatures which are connected to line is approximately 90° behind the voltage generated by the first motor,—or 180° behind the line voltage. The relation between the line voltage and the voltage generated by the motor armatures is therefore such that current may be returned to the line by the motors. It is of course not essential that one of the groups contain but one motor, but it is desirable to have as many motors in the second group as possible in order that the braking action may be most effective. The speed at which the car or train moves during the braking action may conveniently be controlled by varying the point of connection on the transformer, either of the group of armatures or of the field winding of the exciter or of both.

Figure 2:
Figure 3:
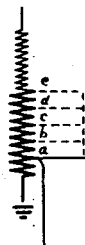

The present invention in its various aspects will be more fully understood and further objects and advantages thereof will appear from the following detailed description taken in connection with the accompanying drawing, wherein Figure 1 indicates diagrammatically a four-motor equipment arranged in accordance with the present invention; Fig. 2 indicates the circuit connections when the motors are operating as motors; and Fig. 3 shows the connections when the motors are serving as braking generators.

Reference being had to the drawings, $M^1$, $M^2$, $M^3$ and $M^4$ represent motors of the usual compensated series type; L indicates a supply conductor carrying current at a high potential; T is a current collecting device carried upon the car or locomotive and arranged to connect the supply conductor to a transformer $T^1$, which, as illustrated, may take the form of a compensator; C is a motor controller of any usual type arranged to connect the motors to the transformer and to move the point of connection so as to vary the voltage across the motors; R S is a reversing switch adapted to reverse the connections between the series field windings and the armatures in order to provide for either direction of rotation of the motors; and S is a commutating switch having running and braking positions. This switch apparatus is all shown in developed form since the mechanical construction thereof may take any usual or desired form.

In order to start the car in a forward direction, the reversing switch and the commutating switch are both moved to the positions wherein the left-hand row of movable contacts engage with the fixed contacts. Then, upon turning the controller into its first running position, current flows from the tap $a$ on the compensator, through contacts 2, 12, 13, and 5, through resistance R, through the armatures and compensating windings of motors $M^1$, $M^2$ and $M^3$, through contacts $s^6$, $3^s$, $5^s$ and $s^9$ of the commutating switch, through the armature and compensating winding of motor $M^4$, through contacts $r^3$, $2^r$, $r^2$ of the reversing switch, through contacts $s^3$, $2^s$, $s^4$ of the commutating switch, through the series field winding of motor $M^4$, through contacts $s^1$, $1^s$ and $s^2$ of the commutating switch, through the series field windings of motors $M^1$, $M^2$ and $M^3$, through contacts $r$, $1^r$, $r^1$ of the reversing switch, through contacts $s^8$, $4^s$, $s^7$ of the commutating switch, to ground. When the controller has fully reached its first running position, contact 1 on the controller engages with contact 11, and the resistance R is cut out. The connections are now as indicated in full lines in Fig. 2. In the successive positions of the controller, the point of connection between the motors and the compensator is shifted from $a$ successively to and through taps $b$, $c$, and $d$, and finally to $e$, as indicated in dotted lines in Fig. 2.

For reverse operation, the commutating switch is left in the same position and the reversing switch is moved into the position wherein the right-hand set of movable contacts engages with the fixed contacts.

When it is desired to cause the motors to operate as braking generators to retard the movement of the car or train, the reversing switch is placed or left in the position corresponding to the direction of movement of the car or train and the commutating switch is brought into the position wherein the right-hand row of movable contacts engages with the fixed contacts. Then, upon operating the controller in the normal manner, one terminal of the armatures of motors $M^1$, $M^2$ and $M^3$ is connected as before to tap $a$ on the compensator but the other terminal is connected to ground through contacts $s^6$, $9^s$ and $s^7$ of the commutating switch; also current flows from tap $a$ on the transformer, through contacts 9, 14, 15 and 10 of the controller, through contacts $s^5$, $8^s$ and $s^4$ of the commutating switch, through the series field of motor $M^4$, through contacts $s^1$, $6^s$ and $s$, to ground. The armature and compensating winding of motor $M^4$, it will be seen, are disconnected from the remaining armatures and a circuit may be traced from the right-hand terminal of the armature of this motor, through contacts $r^3$, $2^r$ and $r^2$ of the reversing switch (assuming the reversing switch to be in the forward running position) through contacts $s^3$, $7^s$, $s^2$ of the commutating switch, through the series field windings of motors $M^1$, $M^2$ and $M^3$, through contacts $r$, $1^r$, $r^1$ of the reversing switch, through contacts $s^8$, $10^s$, $s^9$ of the commutating switch, to the left-hand terminal of the armature of motor $M^4$. The circuit connections are now as indicated in full lines in Fig. 3. By turning the controller through its successive running positions, the point of connection between the armatures of motors $M^1$, $M^2$ and $M^3$ is shifted in succession to taps $b$, $c$, $d$, and $e$, each position of the controller providing for a different braking speed of the motors. Thus the speed of the car or train may be controlled in the same manner when descending inclines as during the ordinary operation thereof.

Although I have shown but one mode of controlling the braking speed of the motors, namely, by varying the connection between the armatures of the motors $M^1$, $M^2$ and $M^3$ and the compensator, it is of course evident that in its broader aspects the present invention contemplates means for varying the circuit relations or conditions as to any of the several elements which make up the complete braking system. Furthermore, it may be desirable at times to control the main circuits by motor controllers of the separately-actuated contact type and to have the controller, reversing switch and commutating switch, or some of them, replaced by master controllers for governing the operation of the separately-actuated switch. The grouping of the motors may of course also be varied to suit individual requirements, it being, however, preferable to have as many armatures in the regenerative group as possible in order to obtain the greatest braking effect and to return a maximum percentage of energy to the line.

What I claim as new and desire to secure by Letters Patent of the United States, is,—

1. The method of braking electrically in systems embodying a plurality of motors adapted to drive a common load, which consists in operating a portion of the motors as separately-excited generators driven by the load and operating other of said motors as generators driven by the load and excited by current generated in the first-named portion of the motors.

2. The method of braking electrically in systems embodying a plurality of motors adapted to drive a common load, which consists in operating a portion of the motors as generators excited from the source of current supply, exciting other of the motors with the current so generated, and connecting the armatures of the latter motors to the source of supply in such relation that the current generated in said armatures may flow to said source of supply.

3. The method of braking electrically in systems comprising a plurality of series motors connected to a common load, which consists in operating a portion of the motors as generators driven by the load and excited from the main source of supply and connecting the remaining motors to the source of supply and operating them as generators driven by the load and excited by current generated in the other motors.

4. The method of braking electrically in a system comprising a plurality of motors connected to a common load and adapted to receive current from a transformer, which consists in operating a portion of said motors as generators driven by the load and excited from the transformer and operating the other motors as generators driven by the load, excited by current generated in the first-mentioned motors and returning current to the transformers.

5. The method of braking electrically in a system comprising a plurality of motors connected to a common load and adapted to receive current from a transformer, which consists in operating a portion of said motors as generators driven by the load and excited from the transformer and operating the other motors as generators driven by the load, excited by current generated in the first-mentioned motors and returning current to the transformer, and varying the point of connection between one of the elements and the transformer.

6. In combination, a plurality of motors connected to a common load, a source of current supply, and switch mechanism constructed and arranged to connect said motors to said source of current supply to drive the load, or to connect a portion of the motors for operation as generators excited from said source of supply and driven by the load and supplying current to the field windings of the other motors.

7. In combination, a plurality of motors connected to a common load, means for supplying said motors with current in order to drive the load, and means for connecting one of said motors for operation as a separately excited generator driven by the load and for connecting the other motors as generators driven by the load and excited by current generated in the first motor.

8. In combination, a plurality of series motors connected to a common load, a source of current supply, and control apparatus constructed and arranged to connect said motors to said source of current supply in order to drive the load, or to connect the field winding of one of the motors and the armatures of the other motors to the source of supply and connect the remaining field windings to the armature terminals of the first motor.

9. In combination, a plurality of series motors connected to a common load, a source of alternating current supply, and switch mechanism constructed and arranged to connect said motors to said source of current supply to drive the load, or to connect a portion of said motors for operation as generators driven by the load and excited from said source of supply and connect the remaining motors for operation as generators excited by current generated by the other portion of motors and returning current to the source of supply.

10. In combination, a plurality of motors connected to a common load, a source of alternating current supply, and switch apparatus having contacts connected and arranged to connect said motors to said source of current supply to drive the load, or to connect the field winding of one motor and the armatures of the other motors in parallel circuits to the source of current supply and connect the remaining field windings to the terminals of the armature of the first motor.

11. In combination, a plurality of series motors connected to a common load, a transformer, and switch apparatus having contacts connected and arranged to connect said motors to said transformer to drive the load, or to connect the field winding of one motor and the armatures of the remaining motors in parallel circuits to said transformer, connect the remaining field windings across the terminals of the armature of the first motor, and vary the point of connection of one of said parallel circuits with the transformer.

12. In combination, a plurality of series motors connected to a common load, a transformer, and switch apparatus having contacts connected and arranged to connect said motors to said transformer to drive the load, or to connect the field winding of one motor and the armatures of the remaining motors in parallel circuits to said transformer, connect the remaining field windings across the terminals of the armature of the first motor, and vary the point of connection of the circuit containing the armatures with the transformer.

13. In combination, a plurality of series motors connected to a common load, a transformer, control apparatus for connecting said motors to said transformer and varying the point of connection with the transformer, and switch mechanism for modifying the circuit conditions so that the normal operation of the control apparatus causes the field winding of one motor and the armatures of the other motors to be connected in parallel to the transformer and the remaining field windings to be connected across the armature of the first motor.

14. In combination, a plurality of series motors connected to a common load, a transformer, a controller constructed and arranged to connect said motors to said transformer to drive the load and to vary the point of connection of the motors with the transformer, and a switch for modifying the circuit conditions in order that the normal operation of the controller causes the field winding of one motor and the armatures of the other motors to be connected to the transformer in parallel circuits and the remaining field windings to be connected across the terminals of the first motor, and the point of connection of the said circuit containing the said motor armatures with the transformer to be varied.

In witness whereof, I have hereunto set my hand this 5th day of June, 1906.

WALTER I. SLICHTER.

Witnesses:
BENJAMIN B. HULL,
HELEN ORFORD.